(12) United States Patent
Honda (10) Patent No.: US 6,353,747 B1
(45) Date of Patent: Mar. 5, 2002

(54) PORTABLE CELLULAR PHONE BASE STATION

(75) Inventor: Toshio Honda, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/203,267

(22) Filed: Dec. 1, 1998

(30) Foreign Application Priority Data

Dec. 2, 1997 (JP) ............................................ 9-331608

(51) Int. Cl.[7] ................................................ H04Q 7/30
(52) U.S. Cl. ........................ 455/550; 455/343; 455/572
(58) Field of Search ................................ 455/561, 572, 455/573, 574, 127, 343

(56) References Cited

U.S. PATENT DOCUMENTS

| | | | | |
|---|---|---|---|---|
| 4,829,554 A | * | 5/1989 | Barnes et al. .................. | 379/58 |
| 5,623,531 A | * | 4/1997 | Nilssen .......................... | 379/56 |
| 5,751,789 A | * | 5/1998 | Farris et al. ................... | 379/34 |
| 5,802,173 A | * | 9/1998 | Hamilton-Piercy et al. . | 455/561 |
| 6,078,785 A | * | 6/2000 | Bush .............................. | 455/7 |

FOREIGN PATENT DOCUMENTS

| | | |
|---|---|---|
| EP | 0 163 311 A2 | 12/1985 |
| GB | 672931 | 5/1952 |
| GB | 2281458 A | 3/1995 |
| GB | 2 326 313 A | 12/1998 |
| JP | 123863/1987 | 6/1987 |
| JP | 4-96431 | 3/1992 |
| JP | 31890/1992 | 3/1992 |
| JP | 6-315056 | 11/1994 |
| JP | 154319/1995 | 6/1995 |
| JP | 32654/1996 | 2/1996 |
| WO | WO 94/22239 A1 | 9/1994 |

* cited by examiner

*Primary Examiner*—Daniel Hunter
*Assistant Examiner*—Thuan T. Nguyen
(74) *Attorney, Agent, or Firm*—Scully, Scott, Murphy & Presser (57) ABSTRACT

When failure occurred to a part of the portable cellular phone base station, the part sends a failure information signal to a control section in order to inform the control section of the occurrence of the failure. The control section judges whether or not the portable cellular phone base station has lost its functions. If it is judged that the portable cellular phone base station has lost its functions, the control section sends a power supply interruption signal to a power supply of the portable cellular phone base station. When the power supply received the power supply interruption signal, relay circuits of the power supply are opened, and power supply from the power supply and a backup battery circuit to other parts of the portable cellular phone base station is interrupted, thereby wasteful power consumption (battery consumption) by the portable cellular phone base station after losing functions can be eliminated. The interruption of power supply can also be executed by sending a power supply interruption instruction signal from higher level equipment to the portable cellular phone base station, therefore, wasteful power consumption can easily be stopped without sending maintenance staffs to the place where the portable cellular phone base station has been installed.

24 Claims, 6 Drawing Sheets

PORTABLE CELLULAR PHONE BASE STATION

BACKGROUND OF THE INVENTION

The present invention relates to a base station for portable cellular phones (hereafter referred to as a "portable cellular phone base station"), and in particular, to a portable cellular phone base station which can reduce power consumption in cases where failure that impairs the functions of the portable cellular phone base station occurred.

DESCRIPTION OF THE PRIOR ARE

Base stations for portable cellular phones (i.e. portable cellular phone base stations) are generally powered by the commercial power source (AC120 V, for example). Such a portable cellular phone base station operates using power applied by its power supply which is connected to the commercial power source by a plug etc. Some types of portable cellular phone base stations are provided with backup battery circuits for supplying power to parts of the portable cellular phone base station in cases where power from the commercial power source failed (in cases of power failure).

Generally, the power supply, which supplies power to parts of the portable cellular phone base station, keeps on supplying power to the parts of the portable cellular phone base station even if the portable cellular phone base station has lost its functions due to failure which occurred to one or more parts of the portable cellular phone base station, as long as the power supply can operate normally. Therefore, a considerable amount of wasteful power consumption occurs in such conventional portable cellular phone base stations.

In the case of the portable cellular phone base station which is provided with the backup battery circuit, the backup battery circuit starts supplying power to parts of the portable cellular phone base station when the power from the commercial power source fails. Also in this case, the backup battery circuit keeps on supplying power to the parts of the portable cellular phone base station even if the portable cellular phone base station has lost its functions due to failure which occurred to one or more parts of the portable cellular phone base station, as long as the backup battery circuit can operate normally. Therefore, also in this case, a considerable amount of wasteful power consumption (battery consumption) occurs.

When such conventional portable cellular phone base station lost its functions, it is impossible to interrupt the power supply from the commercial power source or the backup battery circuit to parts of the portable cellular phone base station by remote control. Therefore, some maintenance staffs of the telephone company have to go to the place where the portable cellular phone base station has been installed and stop the power supply to the parts of the portable cellular phone base station.

SUMMARY OF THE INVENTION

It is therefore the primary object of the present invention to provide a portable cellular phone base station which can eliminate wasteful power consumption in cases where failure that impairs the functions of the portable cellular phone base station occurred.

Another object of the present invention is to provide a portable cellular phone base station which is provided with a backup battery circuit for supplying power to parts of the portable cellular phone base station in cases where power from the commercial power source failed, by which wasteful battery consumption of the backup battery circuit can be eliminated in cases where failure that impairs the functions of the portable cellular phone base station occurred.

Another object of the present invention is to provide a portable cellular phone base station, in which power supply to parts of the portable cellular phone base station can easily be stopped without sending maintenance staffs to the place where the portable cellular phone base station has been installed.

In accordance with a first aspect of the present invention, there is provided a portable cellular phone base station which is powered by a commercial power source, comprising a power supply means, a power supply interruption signal generation means, and a power supply interruption means. The power supply means is supplied power from the commercial power source and thereby supplies power to parts of the portable cellular phone base station. The power supply interruption signal generation means generates a power supply interruption signal in cases where a failure information signal indicating occurrence of failure is supplied from one or more parts of the portable cellular phone base station and it is judged that the portable cellular phone base station has lost its functions. And the power supply interruption means interrupts the power supply from the power supply means to the parts of the portable cellular phone base station in cases where the power supply interruption signal is supplied from the power supply interruption signal generation means.

In accordance with a second aspect of the present invention, in the first aspect, the power supply interruption means includes a relay circuit which is provided between the power supply means and the parts of the portable cellular phone base station to be opened according to the supply of the power supply interruption signal.

In accordance with a third aspect of the present invention, in the first aspect, the power supply interruption means includes a power supply means ON/OFF control means which turns the power supply means OFF according to the supply of the power supply interruption signal.

In accordance with a fourth aspect of the present invention, in the first aspect, the power supply interruption means includes a relay circuit which is provided between the commercial power source and the power supply means to be opened according to the supply of the power supply interruption signal.

In accordance with a fifth aspect of the present invention, there is provided a portable cellular phone base station which is powered by a commercial power source, comprising a power supply means, a power supply interruption instruction signal reception means, a power supply interruption signal generation means, and a power supply interruption means. The power supply means is supplied power from the commercial power source and thereby supplies power to parts of the portable cellular phone base station. The power supply interruption instruction signal reception means receives a power supply interruption instruction signal which is sent from higher level equipment in order to instruct the portable cellular phone base station to interrupt the power supply from the power supply means to the parts of the portable cellular phone base station. The power supply interruption signal generation means generates a power supply interruption signal in cases where the power supply interruption instruction signal addressed to the portable cellular phone base station is received by the power supply interruption instruction signal reception means. And the power supply interruption means interrupts the power supply from the power supply means to the parts of the portable cellular phone base station in cases where the power supply interruption signal is supplied from the power supply interruption signal generation means.

In accordance with a sixth through eighth aspects of the present invention, in the fifth aspect, the power supply interruption means described in the second through fourth aspects are employed.

In accordance with a ninth aspect of the present invention, there is provided a portable cellular phone base station which is powered by a commercial power source, comprising a power supply means, a power supply interruption instruction signal reception means, a power supply interruption signal generation means, and a power supply interruption means. The power supply means is supplied power from the commercial power source and thereby supplies power to parts of the portable cellular phone base station. The power supply interruption instruction signal reception means receives a power supply interruption instruction signal which is sent from higher level equipment in order to instruct the portable cellular phone base station to interrupt power supply from the power supply means to the parts of the portable cellular phone base station. The power supply interruption signal generation means generates a power supply interruption signal in cases where a failure information signal indicating occurrence of failure is supplied from one or more parts of the portable cellular phone base station and it is judged that the portable cellular phone base station has lost its functions, and in cases where the power supply interruption instruction signal addressed to the portable cellular phone base station is received by the power supply interruption instruction signal reception means. And the power supply interruption means interrupts the power supply from the power supply means to the parts of the portable cellular phone base station in cases where the power supply interruption signal is supplied from the power supply interruption signal generation means.

In accordance with a tenth through twelfth aspects of the present invention, in the ninth aspect, the power supply interruption means described in the second through fourth aspects are employed.

In accordance with a thirteenth aspect of the present invention, there is provided a portable cellular phone base station which is powered by a commercial power source, comprising a power supply means, a backup battery means, a power supply interruption signal generation means, and a power supply interruption means. The power supply means is supplied power from the commercial power source and thereby supplies power to parts of the portable cellular phone base station. The backup battery means supplies power to the parts of the portable cellular phone base station in cases where the power from the commercial power source failed. The power supply interruption signal generation means generates a power supply interruption signal in cases where a failure information signal indicating occurrence of failure is supplied from one or more parts of the portable cellular phone base station and it is judged that the portable cellular phone base station has lost its functions. And the power supply interruption means interrupts the power supply from the power supply means and the backup battery means to the parts of the portable cellular phone base station in cases where the power supply interruption signal is supplied from the power supply interruption signal generation means.

In accordance with a fourteenth aspect of the present invention, in the thirteenth aspect, the power supply interruption means includes two relay circuits. One relay circuit is provided between the power supply means and the parts of the portable cellular phone base station to be opened according to the supply of the power supply interruption signal. The other relay circuit is provided between the backup battery means and the parts of the portable cellular phone base station to be opened according to the supply of the power supply interruption signal.

In accordance with a fifteenth aspect of the present invention, in the thirteenth aspect, the power supply interruption means includes a power supply means ON/OFF control means and a relay circuit. The power supply means ON/OFF control means turns the power supply means OFF according to the supply of the power supply interruption signal. The relay circuit is provided between the backup battery means and the parts of the portable cellular phone base station to be opened according to the supply of the power supply interruption signal.

In accordance with a sixteenth aspect of the present invention, in the thirteenth aspect, the power supply interruption means includes two relay circuits. One relay circuit is provided between the commercial power source and the power supply means to be opened according to the supply of the power supply interruption signal. The other relay circuit is provided between the backup battery means and the parts of the portable cellular phone base station to be opened according to the supply of the power supply interruption signal.

In accordance with a seventeenth aspect of the present invention, there is provided a portable cellular phone base station which is powered by a commercial power source, comprising a power supply means, a backup battery means, a power supply interruption instruction signal reception means, a power supply interruption signal generation means, and a power supply interruption means. The power supply means is supplied power from the commercial power source and thereby supplies power to parts of the portable cellular phone base station. The backup battery means supplies power to the parts of the portable cellular phone base station in cases where the power from the commercial power source failed. The power supply interruption instruction signal reception means receives a power supply interruption instruction signal which is sent from higher level equipment in order to instruct the portable cellular phone base station to interrupt the power supply from the power supply means and the backup battery means to the parts of the portable cellular phone base station. The power supply interruption signal generation means generates a power supply interruption signal in cases where the power supply interruption instruction signal addressed to the portable cellular phone base station is received by the power supply interruption instruction signal reception means. And the power supply interruption means interrupts the power supply from the power supply means and the backup battery means to the parts of the portable cellular phone base station in cases where the power supply interruption signal is supplied from the power supply interruption signal generation means.

In accordance with an eighteenth through twentieth aspects of the present invention, in the seventeen aspect, the power supply interruption means described in the fourteenth through sixteenth aspects are employed.

In accordance with a twenty-first aspect of the present invention, there is provided a portable cellular phone base station which is powered by a commercial power source, comprising a power supply means, a backup battery means, a power supply interruption instruction signal reception means, a power supply interruption signal generation means, and a power supply interruption means. The power supply means is supplied power from the commercial power source and thereby supplies power to parts of the portable cellular phone base station. The backup battery means supplies power to the parts of the portable cellular phone base station in cases where the power from the commercial power source failed. The power supply interruption instruction signal reception means receives a power supply interruption instruction signal which is sent from higher level equipment in order to instruct the portable cellular phone base station to interrupt the power supply from the power supply means and the backup battery means to the parts of the portable cellular phone base station. The power supply interruption signal generation means generates a power supply interruption signal in cases where a failure information signal indicating occurrence of failure is supplied from one or more parts of the portable cellular phone base station and it is judged that the portable cellular phone base station has lost its functions, and in cases where the power supply interruption instruction signal addressed to the portable cellular phone base station is received by the power supply interruption instruction signal reception means. And the power supply interruption means interrupts the power supply from the power supply means and the backup battery means to the parts of the portable cellular phone base station in cases where the power supply interruption signal is supplied from the power supply interruption signal generation means.

In accordance with a twenty-second through twenty-fourth aspects of the present invention, in the twenty-first aspect, the power supply interruption means described in the fourteenth through sixteenth aspects are employed.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Referring now to the drawings, a description will be given in detail of preferred embodiments in accordance with the present invention.

Figure 1:
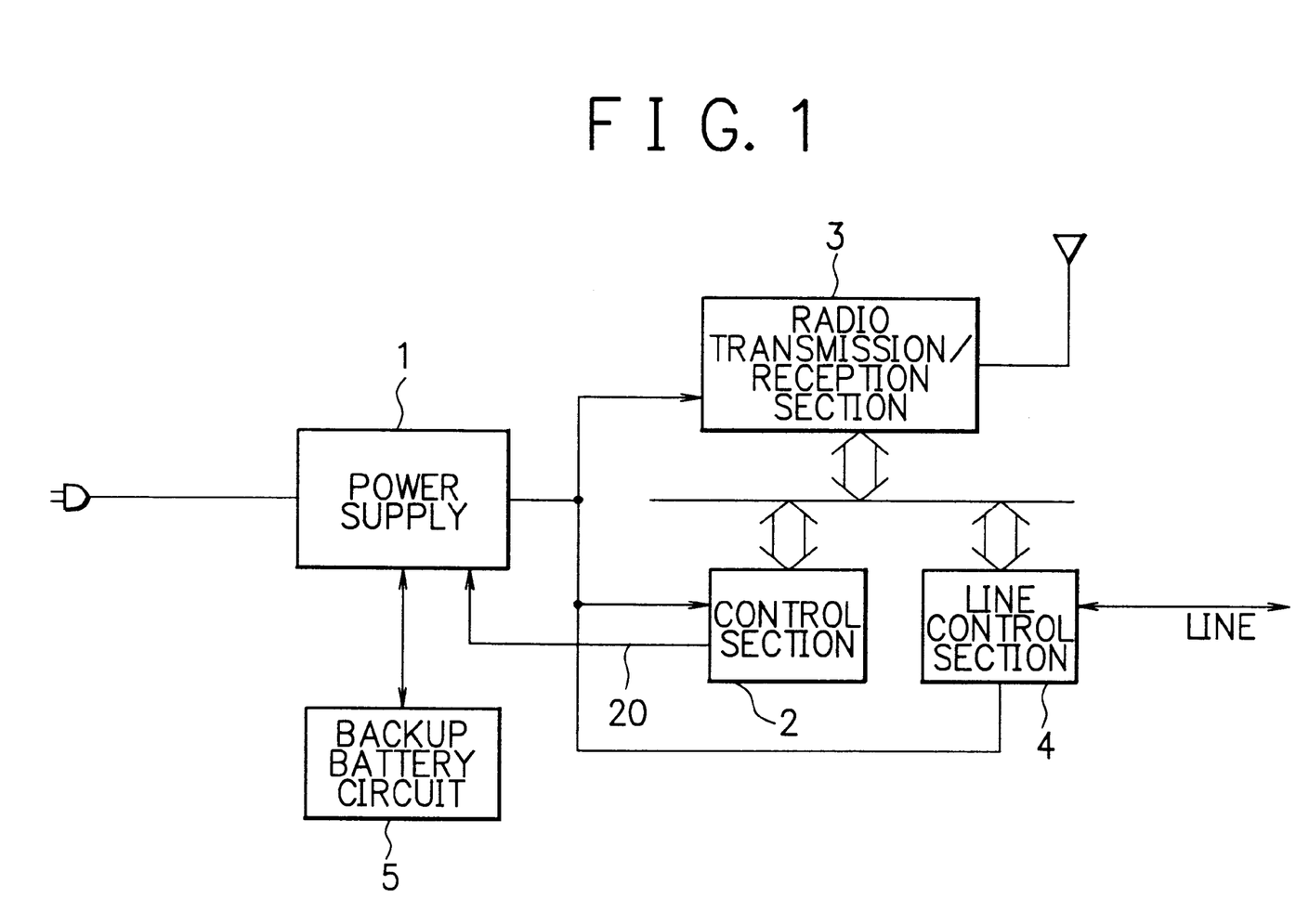
FIG. 1 is a block diagram showing a portable cellular phone base station according to a first embodiment of the present invention.

FIG. 1 is a block diagram showing a portable cellular phone base station according to a first embodiment of the present invention. Referring to FIG. 1, the portable cellular phone base station comprises a power supply 1, a control section 2, a radio transmission/reception section 3, a line control section 4, and a backup battery circuit 5.

The power supply 1 is connected to the other parts of the portable cellular phone base station in order to supply power to the parts. The control section 2, the radio transmission/reception section 3 and the line control section 4 are connected together by bus. The control section 2 is realized by, for example, a microprocessor unit which is composed of a CPU (Central Processing Unit), ROM (Read Only Memory), RAM (Random Access Memory), etc., and appropriate software.

The power supply 1 is provided with an AC/DC converter and is connected to a commercial power source by a plug etc. The power supply 1 is supplied with AC voltage (120V, for example) from the commercial power source, converts the AC voltage to a DC voltage by the AC/DC converter, and supplies the DC voltage to parts of the portable cellular phone base station. The control section 2 controls parts of the portable cellular phone base station. The control section 2 outputs a power supply interruption signal 20 to the power supply 1 in cases where the control section 2 received a failure information signal 21 from one or more parts of the portable cellular phone base station in which failure occurred and it is judged that the portable cellular phone base station has lost its functions. The radio transmission/reception section 3 executes radio communication (transmission/reception) with portable cellular phones. The line control section 4 is connected to higher level equipment (such as an exchange (switch), a communication device in a maintenance center, etc.) via lines and executes communication with the higher level equipment. The backup battery circuit 5 is charged by the power supply 1 when the portable cellular phone base station is powered by the commercial power source. The backup battery circuit 5 supplies power to parts of the portable cellular phone base station in cases where the power from the commercial power source fails or is shut down (in case of power failure).

Figure 2:
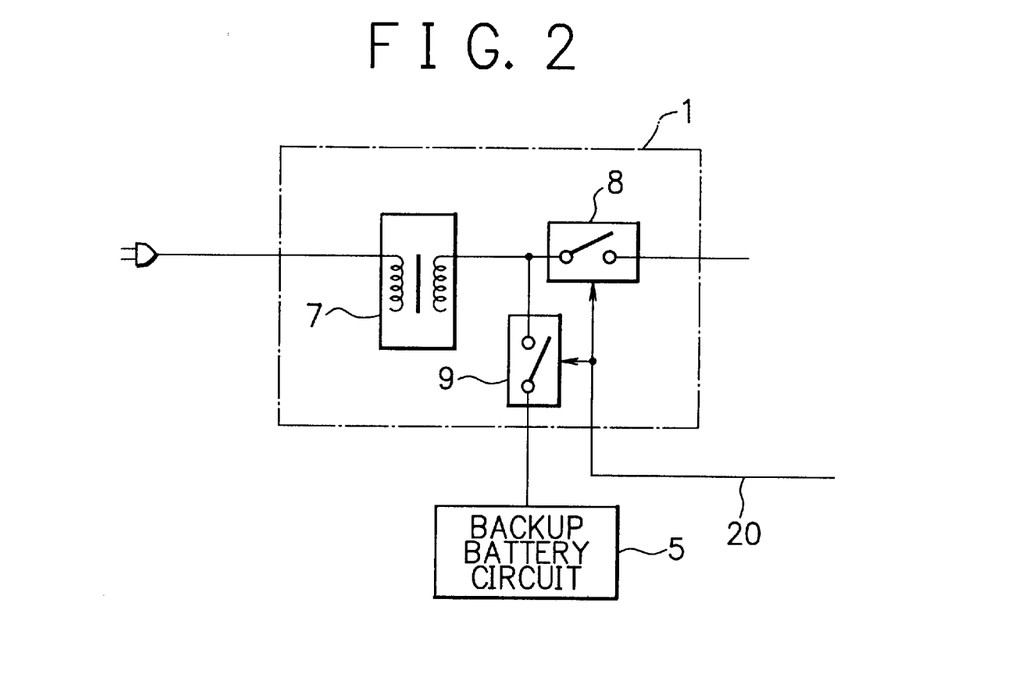
FIG. 2 is a schematic circuit diagram showing internal composition of a power supply which is provided in the portable cellular phone base station of FIG. 1.

FIG. 2 is a schematic circuit diagram showing an example of internal composition of the power supply 1. Referring to FIG. 2, the power supply 1 is composed of an AC/DC converter 7 and relay circuits 8 and 9. The input terminal of the AC/DC converter 7 is connected to the commercial power source. The relay circuit 8 is provided between the output terminal of the AC/DC converter 7 and parts of the portable cellular phone base station such as the control section 2, the radio transmission/reception section 3 and the line control section 4. The relay circuit 9 is provided between the output terminal of the AC/DC converter 7 and the backup battery circuit 5. The relay circuits 8 and 9 are connected with the control section 2 and are controlled by the control section 2. The relay circuits 8 and 9 are usually closed, regardless of whether or not the power from the commercial power source is supplied to the portable cellular phone base station.

When failure occurred to a part (component) of the portable cellular phone base station, the part sends a failure information signal 21 to the control section 2 in order to inform the control section 2 of the occurrence of the failure. For example, when failure occurred to a power amplifier of the radio transmission/reception section 3, the radio transmission/reception section 3 can no more execute radio transmission since the power amplifier does not work, therefore, the radio transmission/reception section 3 sends a transmission power abnormality signal 22 (i.e. a type of the failure information signal 21) to the control section 2 via the bus. The control section 2 which received the transmission power abnormality signal 22 (i.e. the failure information signal 21) judges whether or not the portable cellular phone base station has lost its functions, and sends the power supply interruption signal 20 to the relay circuits 8 and 9 of the power supply 1 if it is judged that the portable cellular phone base station has lost its functions. The relay circuits 8 and 9 which received the power supply interruption signal 20 open themselves, and thereby shut off power supply from the power supply 1 and the backup battery circuit 5 to the other parts of the portable cellular phone base station.

By the operation which has been described above, power supply to parts of the portable cellular phone base station can be interrupted immediately in cases where failure that impairs the functions of the portable cellular phone base station occurred. and thereby wasteful power consumption and battery consumption after such failure can be avoided.

The portable cellular phone base station is also provided with a unique ID number for discriminating between portable cellular phone base stations which are connected to the higher level equipment. The higher level equipment is provided with functions for sending a power supply interruption instruction signal 23 to one or more portable cellular phone base stations. In the case where the power supply interruption instruction signal 23 is transmitted by the higher level equipment, the power supply interruption instruction signal 23 is received by the line control section 4 of each portable cellular phone base station and is supplied to the control section 2 of the portable cellular phone base station. The control section 2 which received the power supply interruption instruction signal 23 refers to ID information which is included in the power supply interruption instruction signal 23. If the ID information matched the ID number of the portable cellular phone base station itself, the control section 2 generates the power supply interruption signal 20 and sends the power supply interruption signal 20 to the relay circuits 8 and 9 of the power supply 1. Also in this case, the power supply from the power supply 1 and the backup battery circuit 5 to the other parts of the portable cellular phone base station is interrupted, in the same way as the case described above.

Incidentally, the interruption of the power supply according to the power supply interruption signal 20 is executed regardless of whether or not the power is supplied from the commercial power source. Even in the case where the power supplied from the commercial power source failed, power supply from the backup battery circuit 5 to parts of the portable cellular phone base station is interrupted by the relay circuit 9, and thereby wasteful power consumption (battery consumption) is avoided.

As described above, in the portable cellular phone base station according to the first embodiment of the present invention, the power supply interruption signal 20 is generated and outputted by the control section 2 in cases where the failure information signal 21 is supplied from one or more parts of the portable cellular phone base station and it is judged that the portable cellular phone base station has lost its functions, and in cases where the power supply interruption instruction signal 23 is sent from the higher level equipment, and power supply from the commercial power source and the backup battery circuit 5 to parts of the portable cellular phone base station is interrupted by the relay circuits 8 and 9 according to supply of the power supply interruption signal 20. Therefore, wasteful power consumption (battery consumption) by the portable cellular phone base station after losing functions can be eliminated. The interruption of the power supply can be executed according to supply of the power supply interruption instruction signal 23 from higher level equipment, therefore, power supply to parts of the portable cellular phone base station can easily be stopped without sending maintenance staffs to the place where the portable cellular phone base station has been installed.

Figure 3:
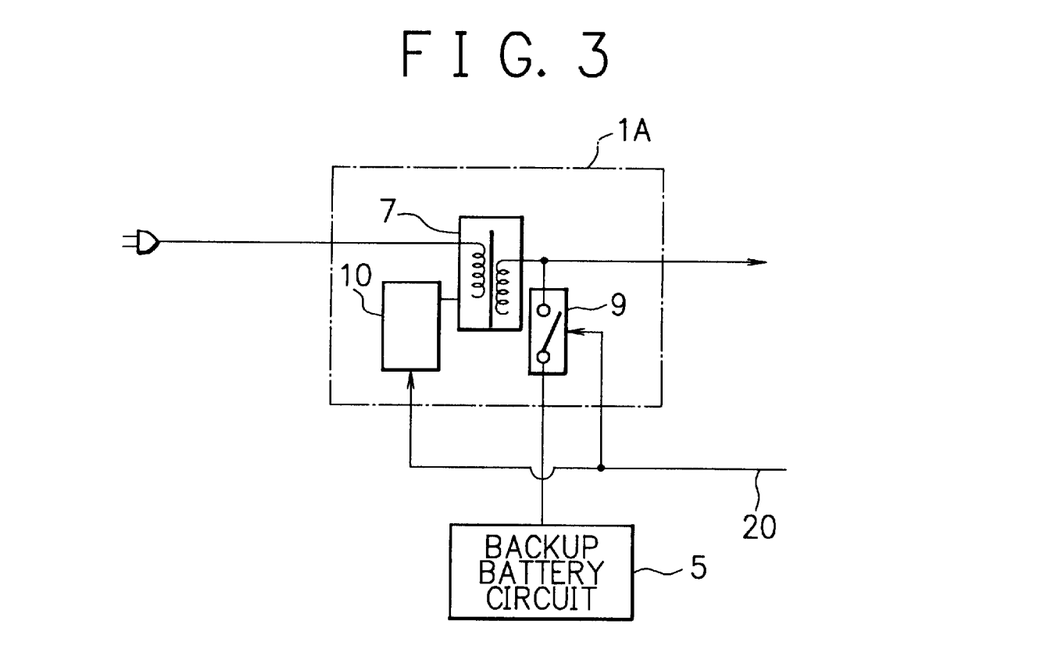
FIG. 3 is a schematic circuit diagram showing internal composition of a power supply which is provided in a portable cellular phone base station according to a second embodiment of the present invention.

In the following, a second embodiment of the present invention will be described referring to FIG. 3. FIG. 3 is a schematic circuit diagram showing internal composition of a power supply 1A which is provided in a portable cellular phone base station according to the second embodiment of the present invention. The portable cellular phone base station of the second embodiment comprises a control section 2, a radio transmission/reception section 3, a line control section 4, a backup battery circuit 5, and the power supply 1A. The parts other than the power supply 1A are the same as those of the first embodiment which have been shown in FIG. 1.

Referring to FIG. 3, the power supply 1A of the second embodiment is composed of an AC/DC converter 7, a relay circuit 9 which is provided between the output terminal of the AC/DC converter 7 and the backup battery circuit 5, and a power supply control circuit 10. The AC/DC converter 7 and the relay circuit 9 are the same as those of the power supply 1 of the first embodiment. The power supply control circuit 10 is connected to the AC/DC converter 7 and controls ON/OFF operation of the AC/DC converter 7. The power supply control circuit 10 is also connected to the control section 2 for being supplied with the power supply interruption signal 20.

When the control section 2 has not received the failure information signal 21 from parts of the portable cellular phone base station nor the power supply interruption instruction signal 23 from higher level equipment, the control section 2 keeps the power supply interruption signal 20 at a HIGH level, for example. The power supply interruption signal 20 is supplied to the reset terminal of the power supply control circuit 10. The power supply control circuit 10 is reset when the power supply interruption signal 20 of a LOW level is supplied to the reset terminal. When the power supply interruption signal 20 is HIGH, the power supply control circuit 10 is kept ON (i.e. in operating status), and the power supply 1A operates as a switching power supply.

When the control section 2 received the failure information signal 21 from parts of the portable cellular phone base station or the power supply interruption instruction signal 23 from higher level equipment, the control section 2 switches the power supply interruption signal 20 to LOW. By this, the power supply control circuit 10 is reset and the AC/DC converter 7 is turned off, and thereby power supply from the power supply 1A (the commercial power source) to parts of the portable cellular phone base station is interrupted. As mentioned before, the relay circuit 9 for the backup battery circuit 5 is usually closed, and opens when the power supply interruption signal 20 (of a LOW level) is supplied from the control section 2, and thereby power supply from the backup battery circuit 5 to parts of the portable cellular phone base station is also interrupted.

As described above, by the portable cellular phone base station according to the second embodiment of the present invention, the same effects as those of the first embodiment can be obtained.

Figure 4:
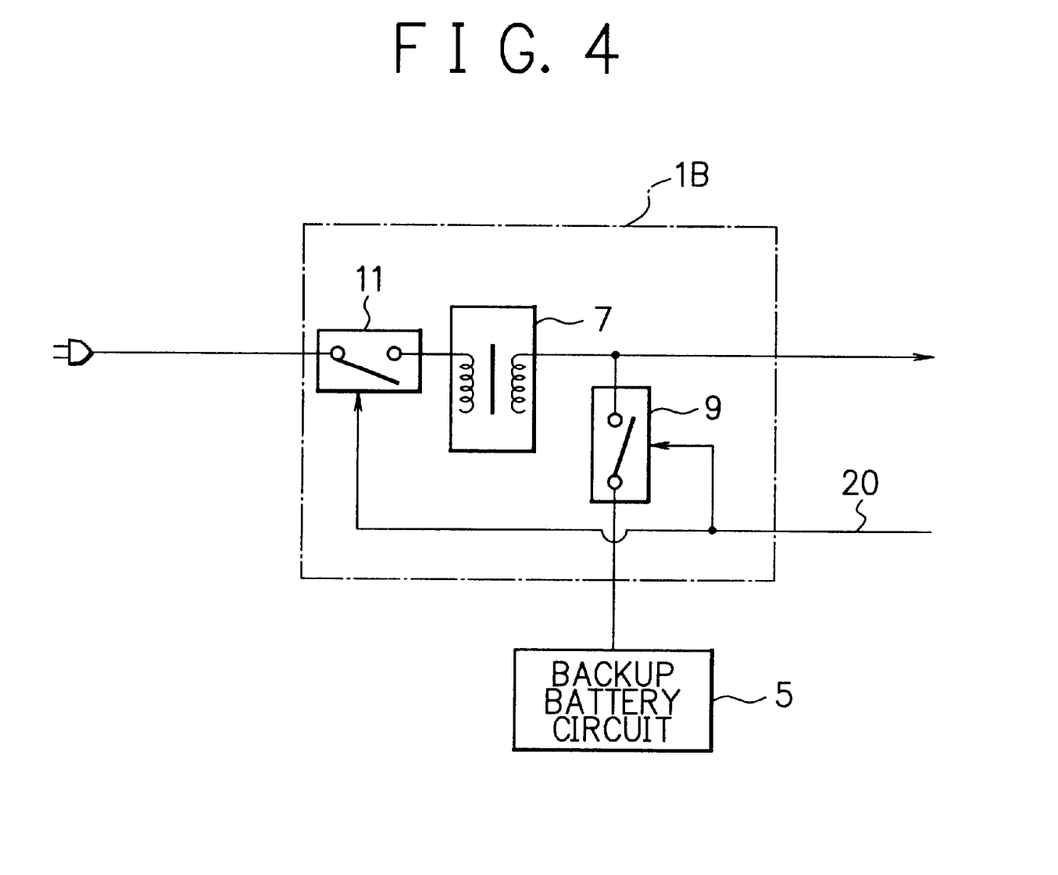
FIG. 4 is a schematic circuit diagram showing internal composition of a power supply which is provided in a portable cellular phone base station according to a third embodiment of the present invention.

In the following, a third embodiment of the present invention will be described referring to FIG. 4. FIG. 4 is a schematic circuit diagram showing internal composition of a power supply 1B which is provided in a portable cellular phone base station according to the third embodiment of the present invention. The portable cellular phone base station of the third embodiment comprises a control section 2, a radio transmission/reception section 3, a line control section 4, a backup battery circuit 5, and the power supply 1B. The parts other than the power supply 1B are the same as those of the first embodiment which have been shown in FIG. 1.

Referring to FIG. 4, the power supply 1B of the third embodiment is composed of an AC/DC converter 7, a relay circuit 11 which is provided to the input terminal of the AC/DC converter 7, and a relay circuit 9 which is provided between the output terminal of the AC/DC converter 7 and the backup battery circuit 5. The AC/DC converter 7 and the relay circuit 9 are the same as those of the power supply 1 of the first embodiment. The relay circuits 9 and 11 are connected to the control section 2 and controlled by the control section 2.

The relay circuits 9 and 11 are usually closed, regardless of whether or not the power from the commercial power source is supplied to the portable cellular phone base station, similarly to the first embodiment. The relay circuits 9 and 11 are opened when the power supply interruption signal 20 is supplied from the control section 2, and thereby interrupts power supply from the power supply 1B (the commercial power source) and the backup battery circuit 5 to the other parts of the portable cellular phone base station.

As described above, by the portable cellular phone base station according to the third embodiment of the present invention, the same effects as those of the first and second embodiments can be obtained.

Incidentally, while the portable cellular phone base station of the first through third embodiments have been provided with the backup battery circuit 5, the present invention can also be applied to portable cellular phone base stations which are not provided with the backup battery circuit 5.

Figure 5:
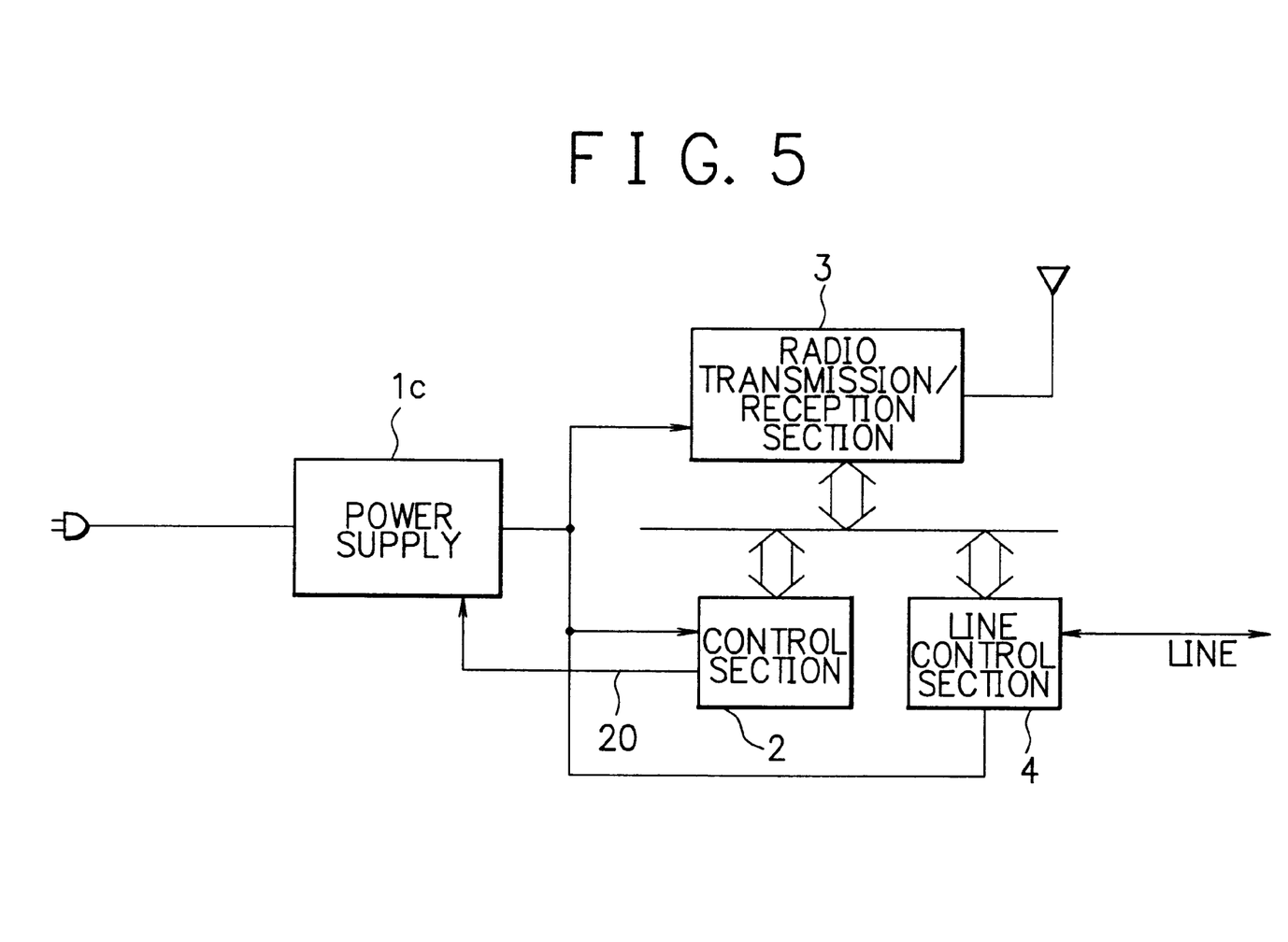
FIG. 5 is a block diagram showing a portable cellular phone base station according to a fourth embodiment of the present invention.

FIG. 5 is a block diagram showing a portable cellular phone base station according to a fourth embodiment of the present invention. Referring to FIG. 5, the portable cellular phone base station of the fourth embodiment comprises a power supply 1C, a control section 2, a radio transmission/reception section 3, and a line control section 4. The portable cellular phone base station of FIG. 5 is not provided with the backup battery circuit 5 of the first through third embodiments, and powered only by the power supply 1C. The parts of the portable cellular phone base station of FIG. 5 other than the power supply 1C are basically the same as those of the first embodiment which have been shown in FIG. 1.

The control section 2 outputs a power supply interruption signal to the power supply 1C in cases where the control section 2 received a failure information signal 21 from one or more parts of the portable cellular phone base station in which failure occurred and it is judged that the portable cellular phone base station has lost its functions. The line control section 4 is connected to higher level equipment (such as an exchange, a communication device in a maintenance center, etc.) via lines and executes communication with the higher level equipment.

Figure 6:
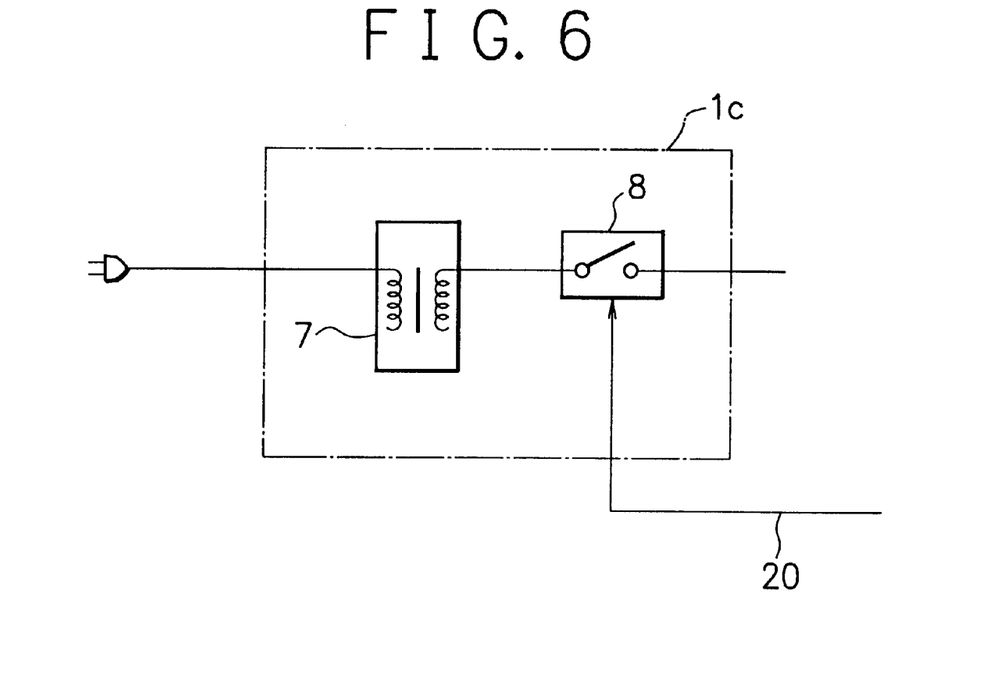
FIG. 6 is a schematic circuit diagram showing internal composition of a power supply which is provided in the portable cellular phone base station of FIG. 5.

FIG. 6 is a schematic circuit diagram showing an example of internal composition of the power supply 1C. Referring to FIG. 6, the power supply 1C is composed of an AC/DC converter 7 and a relay circuit 8. The input terminal of the AC/DC converter 7 is connected to the commercial power source. The relay circuit 8 is provided between the output terminal of the AC/DC converter 7 and parts of the portable cellular phone base station such as the control section 2, the radio transmission/reception section 3 and the line control section 4. The relay circuit 8 is connected with the control section 2 and is controlled by the control section 2. The relay circuit 8 is usually closed in order to supply power from the AC/DC converter 7 to the parts of the portable cellular phone base station.

When failure occurred to a part of the portable cellular phone base station, the part sends a failure information signal 21 to the control section 2 via the bus. The control section 2 which received the failure information signal 21 judges whether or not the portable cellular phone base station has lost its functions, and sends the power supply interruption signal 20 to the relay circuit 8 of the power supply 1C if it is judged that the portable cellular phone base station has lost its functions. The relay circuit 8 which received the power supply interruption signal 20 opens itself, and thereby shuts off power supply from the power supply 1C to the other parts of the portable cellular phone base station.

In the case where the power supply interruption instruction signal 23 is supplied from higher level equipment, the control section 2 refers to ID information in the power supply interruption instruction signal 23, and if the ID information matched the ID number of the portable cellular phone base station itself, the control section 2 sends the power supply interruption signal 20 to the relay circuit 8 of the power supply 1C. Also in this case, the power supply from the power supply 1C to the other parts of the portable cellular phone base station is interrupted, in the same way as the above case.

As described above, in the portable cellular phone base station according to the fourth embodiment of the present invention, the power supply interruption signal 20 is generated and outputted by the control section 2 in cases where the failure information signal 21 is supplied from one or more parts of the portable cellular phone base station and it is judged that the portable cellular phone base station has lost its functions, and in cases where the power supply interruption instruction signal 23 is sent from the higher level equipment, and power supply from the commercial power source to parts of the portable cellular phone base station is interrupted by the relay circuit 8 according to supply of the power supply interruption signal 20. Therefore, wasteful power consumption by the portable cellular phone base station after losing functions can be eliminated. The interruption of the power supply can be executed according to supply of the power supply interruption instruction signal 23 from higher level equipment, therefore, power supply to parts of the portable cellular phone base station can easily be stopped without sending maintenance staffs to the portable cellular phone base station.

Figure 7:
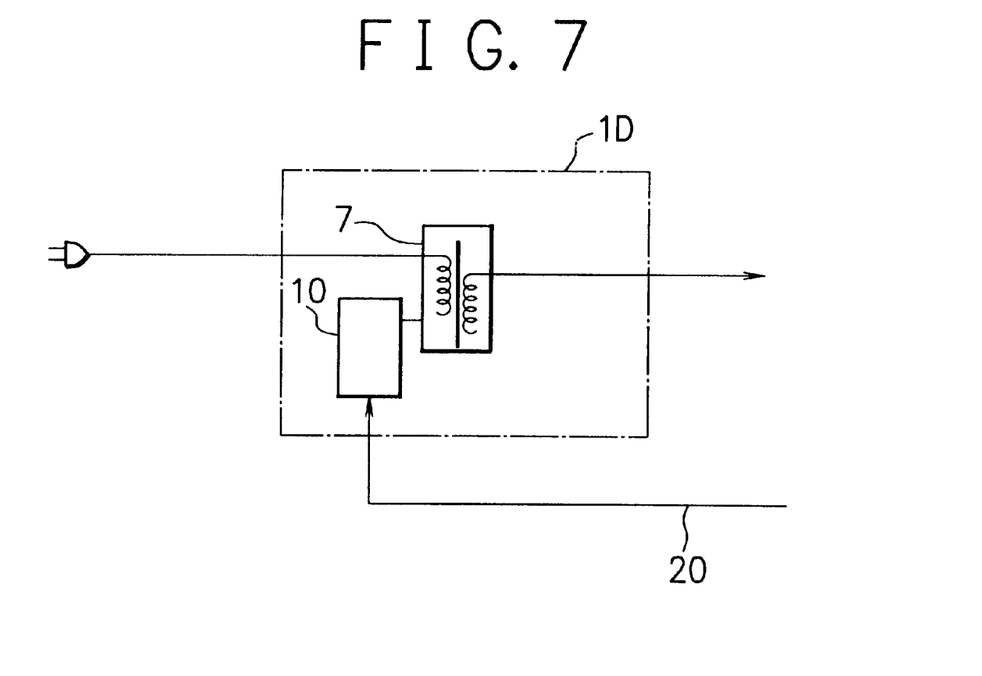
FIG. 7 is a schematic circuit diagram showing internal composition of a power supply which is provided in a portable cellular phone base station according to a fifth embodiment of the present invention.

In the following, a fifth embodiment of the present invention will be described referring to FIG. 7. FIG. 7 is a schematic circuit diagram showing internal composition of a power supply 1D which is provided in a portable cellular phone base station according to the fifth embodiment of the present invention. The portable cellular phone base station of the fifth embodiment comprises a control section 2, a radio transmission/reception section 3, a line control section 4, and the power supply 1D. The parts other than the power supply 1D are the same as those of the fourth embodiment which have been shown in FIG. 5.

Referring to FIG. 7, the power supply 1D of the fifth embodiment is composed of an AC/DC converter 7 and a power supply control circuit 10. The AC/DC converter 7 and the power supply control circuit 10 are the same as those of the power supply 1A of the second embodiment. The power supply control circuit 10 is connected to the AC/DC converter 7 and controls ON/OFF operation of the AC/DC converter 7. The power supply control circuit 10 is operated by a power supply interruption signal 20 which is supplied from the control section 2, in the same way as the second embodiment.

As described above, by the portable cellular phone base station according to the fifth embodiment of the present invention, the same effects as those of the fourth embodiment can be obtained.

Figure 8:
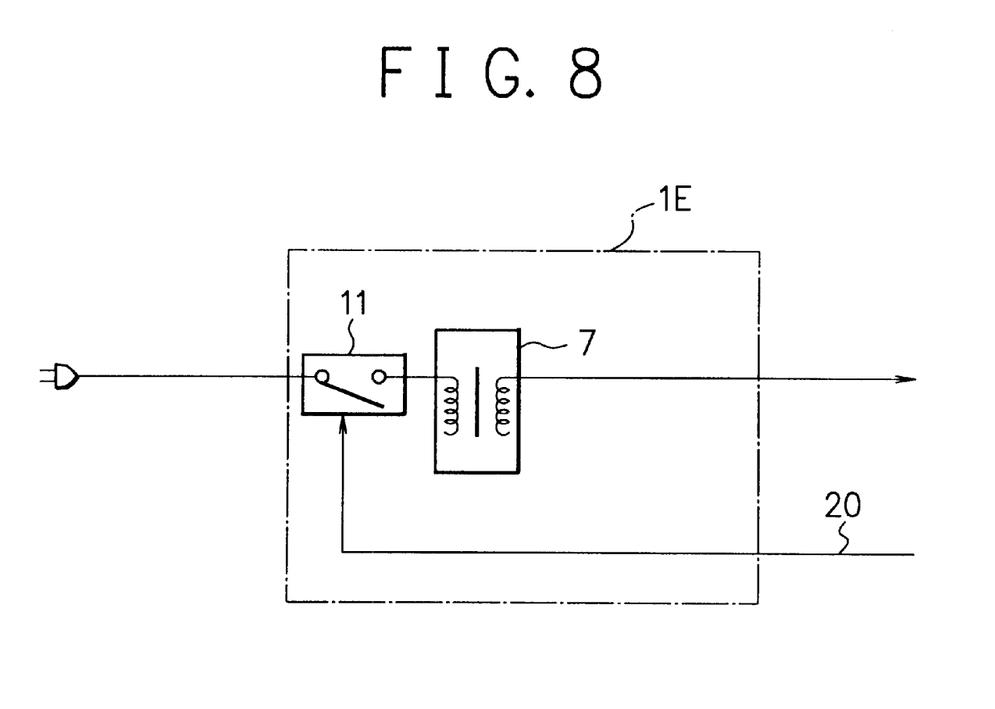
FIG. 8 is a schematic circuit diagram showing internal composition of a power supply which is provided in a portable cellular phone base station according to a sixth embodiment of the present invention.

In the following, a sixth embodiment of the present invention will be described referring to FIG. 8. FIG. 8 is a schematic circuit diagram showing internal composition of a power supply 1E which is provided in a portable cellular phone base station according to the sixth embodiment of the present invention. The portable cellular phone base station of the sixth embodiment comprises a control section 2, a radio transmission/reception section 3, a line control section 4, and the power supply 1E. The parts other than the power supply 1E are the same as those of the fourth embodiment which have been shown in FIG. 5.

Referring to FIG. 8, the power supply 1E of the sixth embodiment is composed of an AC/DC converter 7 and a relay circuit 11 which is provided to the input terminal of the AC/DC converter 7. The AC/DC converter 7 and the relay circuit 11 are the same as those of the power supply 1B of the third embodiment. The relay circuit 11 is opened when the power supply interruption signal 20 is supplied from the control section 2, and thereby power supply from the power supply 1E (the commercial power source) to parts of the portable cellular phone base station is interrupted, in the same way as the third embodiment.

As described above, by the portable cellular phone base station according to the sixth embodiment of the present invention, the same effects as those of the fourth and fifth embodiments can be obtained.

As set forth hereinabove, in the portable cellular phone base station according to the embodiments of the present invention, power supply from the commercial power source to parts of the portable cellular phone base station can be interrupted according to the power supply interruption signal 20 which is outputted by the control section 2 in cases where failure that impairs the functions of the portable cellular phone base station occurred. Therefore, wasteful power consumption by the portable cellular phone base station after losing functions can be eliminated.

Also in the case where the portable cellular phone base station is provided with a backup battery circuit 5 for supplying power to parts of the portable cellular phone base station when power from the commercial power source failed, power supply from the commercial power source and the backup battery circuit 5 to parts of the portable cellular phone base station can be interrupted according to the power supply interruption signal 20 which is outputted by the control section 2 in cases where failure that impairs the functions of the portable cellular phone base station occurred. Therefore, wasteful battery consumption of the backup battery circuit 5 and power consumption in the portable cellular phone base station after losing functions can be eliminated.

The interruption of power supply to parts of the portable cellular phone base station according to the power supply interruption signal 20 can also be executed by sending the power supply interruption instruction signal 23 from higher level equipment (such as an exchange, a communication device in a maintenance center, etc.) to the portable cellular phone base station. Therefore, power supply to parts of the portable cellular phone base station can easily be stopped and thereby wasteful power consumption (and battery consumption) can be eliminated, without sending maintenance staffs to the place where the portable cellular phone base station has been installed.

Incidentally, while the power supply interruption signal 20 in the above embodiments is generated and outputted by the control section 2 in two cases: in the case where the failure information signal 21 is supplied from one or more parts of the portable cellular phone base station to the control section 2 and the control section 2 judged that the portable cellular phone base station has lost its functions, and in the case where the power supply interruption instruction signal 23 is sent from higher level equipment, of course it is also possible to design the portable cellular phone base station so that the control section 2 will generate and output the power supply interruption signal 20 only according to the failure information signal 21 and the judgment, or only according to the power supply interruption instruction signal 23 which is sent from higher level equipment.

In addition, while the power supply interruption instruction signal 23 in the above embodiments is sent from the higher level equipment to the portable cellular phone base station via lines, it is also possible to design the portable cellular phone base station so as to receive the power supply interruption instruction signal 23 from the higher level equipment by means of radio communication.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A portable cellular phone base station which is powered by a commercial power source, comprising:

a power supply means which is supplied power from the commercial power source and thereby supplies power to parts of the portable cellular phone base station;

a power supply interruption signal generation means for generating a power supply interruption signal in cases where a failure information signal indicating occurrence of failure is supplied from one or more parts of the portable cellular phone base station and it is judged that the portable cellular phone base station has lost its functions; and a power supply interruption means coupled to said power supply interruption signal generation means for interrupting the power supply from the power supply means to the parts of the portable cellular phone base station in response to the power supply interruption signal being supplied from the power supply interruption signal generation means.

2. A portable cellular phone base station as claimed in claim 1, wherein the power supply interruption means includes a relay circuit which is provided between the power supply means and the parts of the portable cellular phone base station to be opened according to the supply of the power supply interruption signal.

3. A portable cellular phone base station as claimed in claim 1, wherein the power supply interruption means includes a power supply means ON/OFF control means which turns the power supply means OFF according to the supply of the power supply interruption signal.

4. A portable cellular phone base station as claimed in claim 1, wherein the power supply interruption means includes a relay circuit which is provided between the commercial power source and the power supply means to be opened according to the supply of the power supply interruption signal.

5. A portable cellular phone base station which is powered by a commercial power source, comprising;
- a power supply means which is supplied power from the commercial power source and thereby supplies power to parts of the portable cellular phone base station;
- a power supply interruption instruction signal reception means for receiving a power supply interruption instruction signal which is sent from higher level equipment in order to instruct the portable cellular phone base station to interrupt the power supply from the power supply means to the parts of the portable cellular phone base station;
- a power supply interruption signal generation means for generating a power supply interruption signal in cases where the power supply interruption instruction signal addressed to the portable cellular phone base station is received by the power supply interruption instruction signal reception means; and
- a power supply interruption means coupled to said power supply interruption signal generation means for interrupting the power supply from the power supply means to the parts of the portable cellular phone base station in response to the power supply interruption signal being supplied from the power supply interruption signal generation means.

6. A portable cellular phone base station as claimed in claim 5, wherein the power supply interruption means includes a relay circuit which is provided between the power supply means and the parts of the portable cellular phone base station to be opened according to the supply of the power supply interruption signal.

7. A portable cellular phone base station as claimed in claim 5, wherein the power supply interruption means includes a power supply means ON/OFF control means which turns the power supply means OFF according to the supply of the power supply interruption signal.

8. A portable cellular phone base station as claimed in claim 5, wherein the power supply interruption means includes a relay circuit which is provided between the commercial power source and the power supply means to be opened according to the supply of the power supply interruption signal.

9. A portable cellular phone base station which is powered by a commercial power source, comprising;
- a power supply means which is supplied power from the commercial power source and thereby supplies power to parts of the portable cellular phone base station;
- a power supply interruption instruction signal reception means for receiving a power supply interruption instruction signal which is sent from higher level equipment in order to instruct the portable cellular phone base station to interrupt power supply from the power supply means to the parts of the portable cellular phone base station;
- a power supply interruption signal generation means for generating a power supply interruption signal in cases where a failure information signal indicating occurrence of failure is supplied from one or more parts of the portable cellular phone base station and it is judged that the portable cellular phone base station has lost its functions, and in cases where the power supply interruption instruction signal addressed to the portable cellular phone base station is received by the power supply interruption instruction signal reception means; and
- a power supply interruption means coupled to said power supply interruption signal generation means for interrupting the power supply from the power supply means to the parts of the portable cellular phone base station in response to the power supply interruption signal being supplied from the power supply interruption signal generation means.

10. A portable cellular phone base station as claimed in claim 9, wherein the power supply interruption means includes a relay circuit which is provided between the power supply means and the parts of the portable cellular phone base station to be opened according to the supply of the power supply interruption signal.

11. A portable cellular phone base station as claimed in claim 9, wherein the power supply interruption means includes a power supply means ON/OFF control means which turns the power supply means OFF according to the supply of the power supply interruption signal.

12. A portable cellular phone base station as claimed in claim 9, wherein the power supply interruption means includes a relay circuit which is provided between the commercial power source and the power supply means to be opened according to the supply of the power supply interruption signal.

13. A portable cellular phone base station which is powered by a commercial power source, comprising;
- a power supply means which is supplied power from the commercial power source and thereby supplies power to parts of the portable cellular phone base station;
- a backup battery means for supplying power to the parts of the portable cellular phone base station in cases where the power from the commercial power source failed;
- a power supply interruption signal generation means for 10 generating a power supply interruption signal in cases where a failure information signal indicating occurrence of failure is supplied from one or more parts of the portable cellular phone base station and it is judged that the portable cellular phone base station has lost its functions; and
- a power supply interruption means coupled to said power supply interruption signal generation means for interrupting the power supply from the power supply means and the backup battery means to the parts of the portable cellular phone base station in response to the power supply interruption signal being supplied from the power supply interruption signal generation means.

14. A portable cellular phone base station as claimed in claim 13, wherein the power supply interruption means includes:
- a relay circuit which is provided between the power supply means and the parts of the portable cellular phone base station to be opened according to the supply of the power supply interruption signal; and a relay circuit which is provided between the backup battery means and the parts of the portable cellular phone base station to be opened according to the supply of the power supply interruption signal.

15. A portable cellular phone base station as claimed in claim 13, wherein the power supply interruption means includes:

a power supply means ON/OFF control means which turns the power supply means OFF according to the supply of the power supply interruption signal; and a relay circuit which is provided between the backup battery means and the parts of the portable cellular phone base station to be opened according to the supply of the power supply interruption signal.

16. A portable cellular phone base station as claimed in claim 13, wherein the power supply interruption means includes:

a relay circuit which is provided between the commercial power source and the power supply means to be opened according to the supply of the power supply interruption signal; and a relay circuit which is provided between the backup battery means and the parts of the portable cellular phone base station to be opened according to the supply of the power supply interruption signal.

17. A portable cellular phone base station which is powered by a commercial power source, comprising;

a power supply means which is supplied power from the commercial power source and thereby supplies power to parts of the portable cellular phone base station;

a backup battery means for supplying power to the parts of the portable cellular phone base station in cases where the power from the commercial power source failed;

a power supply interruption instruction signal reception means for receiving a power supply interruption instruction signal which is sent from higher level equipment in order to instruct the portable cellular phone base station to interrupt the power supply from the power supply means and the backup battery means to the parts of the portable cellular phone base station;

a power supply interruption signal generation means for generating a power supply interruption signal in cases where the power supply interruption instruction signal addressed to the portable cellular phone base station is received by the power supply interruption instruction signal reception means; and a power supply interruption means coupled to said power supply interruption signal generation means for interrupting the power supply from the power supply means and the backup battery means to the parts of the portable cellular Phone base station in response to the power supply interruption signal being supplied from the power supply interruption signal generation means.

18. A portable cellular phone base station as claimed in claim 17, wherein the power supply interruption means includes:

a relay circuit which is provided between the power supply means and the parts of the portable cellular phone base station to be opened according to the supply of the power supply interruption signal; and a relay circuit which is provided between the backup battery means and the parts of the portable cellular phone base station to be opened according to the supply of the power supply interruption signal.

19. A portable cellular phone base station as claimed in claim 17, wherein the power supply interruption means includes:

a power supply means ON/OFF control means which turns the power supply means OFF according to the supply of the power supply interruption signal; and a relay circuit which is provided between the backup battery means and the parts of the portable cellular phone base station to be opened according to the supply of the power supply interruption signal.

20. A portable cellular phone base station as claimed in claim 17, wherein the power supply interruption means includes:

a relay circuit which is provided between the commercial power source and the power supply means to be opened according to the supply of the power supply interruption signal; and a relay circuit which is provided between the backup battery means and the parts of the portable cellular phone base station to be opened according to the supply of the power supply interruption signal.

21. A portable cellular phone base station which is powered by a commercial power source, comprising;

a power supply means which is supplied power from the commercial power source and thereby supplies power to parts of the portable cellular phone base station;

a backup battery means for supplying power to the parts of the portable cellular phone base station in cases where the power from the commercial power source failed;

a power Supply interruption instruction signal reception means for receiving a power supply interruption instruction signal which is sent from higher level equipment in order to instruct the portable cellular phone base station to interrupt the power supply from the power supply means and the backup battery means to the parts of the portable cellular phone base station;

a power supply interruption signal generation means for generating a power supply interruption signal in cases where a failure information signal indicating occurrence of failure is supplied from one or more parts of the portable cellular phone base station and it is judged that the portable cellular phone base station has lost its functions, and in cases where the power supply interruption instruction signal addressed to the portable cellular phone base station is received by the power supply interruption instruction signal reception means; and a power supply interruption means coupled to said power supply interruption signal generating means for interrupting the power supply from the power supply means and the backup battery means to the parts of the portable cellular phone base station in response to the power supply interruption signal being supplied from the power supply interruption signal generation means.

22. A portable cellular phone base station as claimed in claim 21, wherein the power supply interruption means includes:

a relay circuit which is provided between the power supply means and the parts of the portable cellular phone base station to be opened according to the supply of the power supply interruption signal; and a relay circuit which is provided between the backup battery means and the parts of the portable cellular phone base station to be opened according to the supply of the power supply interruption signal.

23. A portable cellular phone base station as claimed in claim 21, wherein the power supply interruption means includes:

a power supply means ON/OFF control means which turns the power supply means OFF according to the supply of the power supply interruption signal; and a relay circuit which is provided between the backup battery means and the parts of the portable cellular phone base station to be opened according to the supply of the power supply interruption signal.

24. A portable cellular phone base station as claimed in claim 21, wherein the power supply interruption means includes:

a relay circuit which is provided between the commercial power source and the power supply means to be opened according to the supply of the power supply interruption signal; and a relay circuit which is provided between the backup battery means and the parts of the portable cellular phone base station to be opened according to the supply of the power supply interruption signal.

* * * * *